(12) United States Patent
Manzoni et al.

(10) Patent No.: US 11,306,812 B2
(45) Date of Patent: Apr. 19, 2022

(54) SYSTEM AND METHOD FOR EMERGENCY LUBRICANT FLOW AT AN AIRCRAFT GEAR ASSEMBLY

(71) Applicant: GE Avio S.r.l., Rivalta di Torino (IT)

(72) Inventors: Miriam Manzoni, Sesto San Giovanni (IT); Davide Lercara, Rivalta di Torino (IT); Andrea Piazza, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 138 days.

(21) Appl. No.: 16/585,041

(22) Filed: Sep. 27, 2019

(65) Prior Publication Data

US 2020/0103019 A1 Apr. 2, 2020

(30) Foreign Application Priority Data

Sep. 28, 2018 (IT) .......................... 102018000009033

(51) Int. Cl.
*F16H 57/04* (2010.01)
*B64C 27/12* (2006.01)

(52) U.S. Cl.
CPC ....... *F16H 57/0442* (2013.01); *F16H 57/045* (2013.01); *F16H 57/0421* (2013.01); *B64C 27/12* (2013.01)

(58) Field of Classification Search
CPC ............... F16H 57/042; F16H 57/0421; F16H 57/0423; F16H 57/0424; F16H 57/0442; F16H 57/045
See application file for complete search history.

(56) References Cited

U.S. PATENT DOCUMENTS

| | | | | |
|---|---|---|---|---|
| 1,220,810 A | * | 3/1917 | Alquist ............... | F16H 57/0447 184/6.12 |
| 1,751,634 A | * | 3/1930 | Holmes ............... | F16H 57/0431 184/11.1 |
| 3,383,937 A | * | 5/1968 | Toenne ..................... | F16N 7/18 74/467 |
| 3,771,622 A | * | 11/1973 | Hyakumura ........ | F16H 57/0457 184/11.2 |
| 3,810,528 A | | 5/1974 | Morley et al. | |

(Continued)

FOREIGN PATENT DOCUMENTS

| | | |
|---|---|---|
| CN | 201626552 U | 11/2010 |
| EP | 1191259 | 3/2002 |

(Continued)

OTHER PUBLICATIONS

Italian Search Report Corresponding to IT201800009033 dated Apr. 26, 2019.

*Primary Examiner* — Minh Truong
(74) *Attorney, Agent, or Firm* — Venable LLP; Elizabeth C. G. Gitlin; Michele V. Frank

(57) ABSTRACT

A gear assembly of an aircraft including an engine is generally provided. The gear assembly includes a first gear meshed with a second gear to define a gear mesh, and a walled lubricant tank defining a lubricant reservoir and a reservoir inlet opening. The reservoir inlet opening is defined adjacent to an out-of-mesh side of the gear mesh. At least a portion of lubricant from the gear mesh enters the lubricant reservoir through the reservoir inlet opening.

9 Claims, 5 Drawing Sheets

(56) References Cited

U.S. PATENT DOCUMENTS

| | | | |
|---|---|---|---|
| 4,222,283 A * | 9/1980 | Nagy | F16H 3/089 184/11.2 |
| 4,976,335 A | 12/1990 | Cappellato | |
| 5,341,900 A * | 8/1994 | Hikes | F16H 57/04 184/103.2 |
| 6,691,830 B2 | 2/2004 | Blanc et al. | |
| 7,651,049 B2 | 1/2010 | Carnelli et al. | |
| 8,459,413 B2 | 6/2013 | Gmirya et al. | |
| 8,657,073 B2 * | 2/2014 | Matsumoto | F16H 57/0483 184/11.1 |
| 8,702,373 B1 | 4/2014 | Valva et al. | |
| 8,944,216 B2 | 2/2015 | Rollins et al. | |
| 10,208,624 B2 | 2/2019 | Duong et al. | |
| 10,539,224 B2 * | 1/2020 | Hori | F16H 57/043 |
| 2012/0096968 A1 * | 4/2012 | Kawamoto | F16H 57/0409 74/467 |
| 2012/0145483 A1 * | 6/2012 | Araki | F16H 57/0423 184/6.12 |
| 2013/0233107 A1 * | 9/2013 | Von Wilmowsky | F16H 57/02 74/421 R |
| 2015/0065285 A1 * | 3/2015 | McCune | F16H 57/0482 475/159 |
| 2016/0047281 A1 | 2/2016 | Bastian | |
| 2016/0123457 A1 | 5/2016 | Harreau | |
| 2016/0363208 A1 | 12/2016 | Louis | |
| 2017/0254406 A1 | 9/2017 | Hodgkinson | |
| 2020/0025284 A1 * | 1/2020 | Sadahiro | F16H 57/0423 |

FOREIGN PATENT DOCUMENTS

| | | |
|---|---|---|
| FR | 2159999 A5 | 6/1973 |
| RU | 2108510 C1 | 4/1998 |
| WO | WO2008/091341 A2 | 7/2008 |
| WO | WO2014/133669 A1 | 9/2014 |
| WO | WO2016/061027 A1 | 4/2016 |

* cited by examiner

SYSTEM AND METHOD FOR EMERGENCY LUBRICANT FLOW AT AN AIRCRAFT GEAR ASSEMBLY

GOVERNMENT SPONSORED RESEARCH

The project leading to this application has received funding from the Clean Sky 2 Joint Undertaking under the European Union's Horizon 2020 research and innovation program under grant agreement No. CS2-FRC_GAM-2014-2015-01.

FIELD

The present subject matter relates generally to structures and methods for mitigating lubricant flow loss at a gear assembly of an aircraft.

BACKGROUND

Turboshaft-powered vehicles, such as rotary-wing aircraft, may have accidents or incidents resulting from gear assembly failure (e.g., main gearboxes between an engine and a rotary wing or propeller). Possible failures can result from lubrication system failure at the gear assembly. Such failures may include materials failure, sensor failure, valve failure, etc. preventing lubricant from sufficiently flowing to a gear mesh at the gear assembly.

Known solutions include providing emergency lubricant flow to a gear assembly via auxiliary tanks external to a gearbox housing. Such external tanks are filled pre-flight or use dedicated lubricant delivery systems to store lubricant during normal operating conditions. However, such systems generally add weight and reduce performance of an aircraft while still being prone to system failures.

Other known solutions include internal auxiliary tanks, such as to reduce an amount of components external to the gearbox housing that may fail. However, such systems include dedicated lubricant systems that add weight and reduce performance of the aircraft. Still further, since such auxiliary tanks are internal to the gearbox housing, simple and relatively fast replacement of the auxiliary tank is disabled, thereby preventing changes based on missions or operations of the aircraft.

As such, there is a need for systems and methods for providing emergency flow of lubricant to a gear assembly during partial or complete loss of lubricant flow from a lubricant pump.

BRIEF DESCRIPTION

Aspects and advantages of the invention will be set forth in part in the following description, or may be obvious from the description, or may be learned through practice of the invention.

An aspect of the present disclosure is directed to a gear assembly of an aircraft including an engine. The gear assembly includes a first gear meshed with a second gear to define a gear mesh, and a walled lubricant tank defining a lubricant reservoir and a reservoir inlet opening. The reservoir inlet opening is defined adjacent to an out-of-mesh side of the gear mesh. At least a portion of lubricant from the gear mesh enters the lubricant reservoir through the reservoir inlet opening.

In various embodiments, the gear assembly further includes a walled conduit coupled in fluid communication with the lubricant reservoir. The walled conduit is extended from the lubricant reservoir to an in-mesh side of the gear mesh. In one embodiment, the gear assembly further includes a lubricant dispensing device disposed at the in-mesh side of the gear mesh. The lubricant dispensing device is coupled in fluid communication with the walled conduit. In another embodiment, the lubricant dispensing device comprises teeth corresponding to one or more teeth of the first gear or the second gear.

In still another embodiment, the lubricant dispensing device defines an outlet in fluid communication with the walled conduit and the lubricant reservoir. A flow of lubricant from the lubricant reservoir and the walled conduit is provided to one or more of the first gear or the second gear from the lubricant dispensing device.

In one embodiment, the walled lubricant tank, the walled conduit, and the lubricant dispensing device are coupled together to provide a flow of lubricant to the first gear or the second gear, or both, via gravitational force.

In another embodiment, the reservoir inlet opening is at least partially disposed upward of the lubricant reservoir.

In yet another embodiment, the walled conduit is disposed at a downward angle from the lubricant reservoir to the lubricant dispensing device.

In one embodiment, the gear assembly further includes a gear assembly housing surrounding the first gear and the second gear. The walled lubricant tank is at least partially defined by the gear assembly housing.

In another embodiment, the gear assembly further includes a first lubricant dispenser disposed at an in-mesh side of the gear mesh, and a second lubricant dispenser disposed at the out-of-mesh side of the gear mesh.

In still another embodiment, the gear assembly further includes an overfill device disposed at the lubricant reservoir. The overfill device is configured to prevent filing the lubricant reservoir beyond the overfill device.

Another aspect of the present disclosure is directed to a method for mitigating lubricant flow loss at a gear assembly. The method includes placing a lubricant reservoir inlet opening of a lubricant reservoir adjacent to an out-of-mesh side of a gear mesh; flowing lubricant via gravitational force from the lubricant reservoir to an in-mesh side of the gear mesh; and feeding lubricant to the gear mesh.

In one embodiment, the method further includes feeding lubricant from the gear mesh to the lubricant reservoir via the lubricant reservoir inlet.

In another embodiment, feeding lubricant to the gear mesh includes feeding, via a lubricant dispenser configured to receive lubricant from a lubricant pump, a flow of lubricant to the gear mesh. In one embodiment, the method further includes at least partially filling the lubricant reservoir with lubricant from the lubricant dispenser after the flow of lubricant from the lubricant dispenser has been received by the gear mesh.

Yet another aspect of the present disclosure is directed to an aircraft including a gear assembly. The gear assembly includes a first gear and a second gear together arranged together to define a gear mesh; a lubricant dispenser configured to provide a flow of lubricant to the first gear or the second gear; and a walled lubricant tank defining a lubricant reservoir and a reservoir inlet opening, wherein the reservoir inlet opening is defined adjacent to an out-of-mesh side of the gear mesh; and a lubricant pump configured to provide the flow of lubricant to the lubricant dispenser, wherein at least a portion of lubricant provided to the first gear or the second gear enters the lubricant reservoir through the reservoir inlet opening from the gear mesh.

In one embodiment, the gear assembly further includes a walled conduit coupled in fluid communication from the lubricant reservoir to an in-mesh side of the gear mesh, wherein the walled conduit provides the flow of lubricant from the lubricant reservoir to the in-mesh side of the gear mesh.

In another embodiment, the gear assembly further includes a lubricant dispensing device disposed at the in-mesh side of the gear mesh. In another embodiment, the lubricant reservoir is defined at least partially upward of an outlet of the lubricant dispensing device, and further wherein the flow of lubricant from the lubricant reservoir through the outlet of the lubricant dispensing device is provided via gravitational force.

In one embodiment, the lubricant dispenser is disposed at the out-of-mesh side of the gear mesh. At least a portion of lubricant provided from the lubricant dispenser enters the lubricant reservoir through the reservoir inlet opening from the gear mesh.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
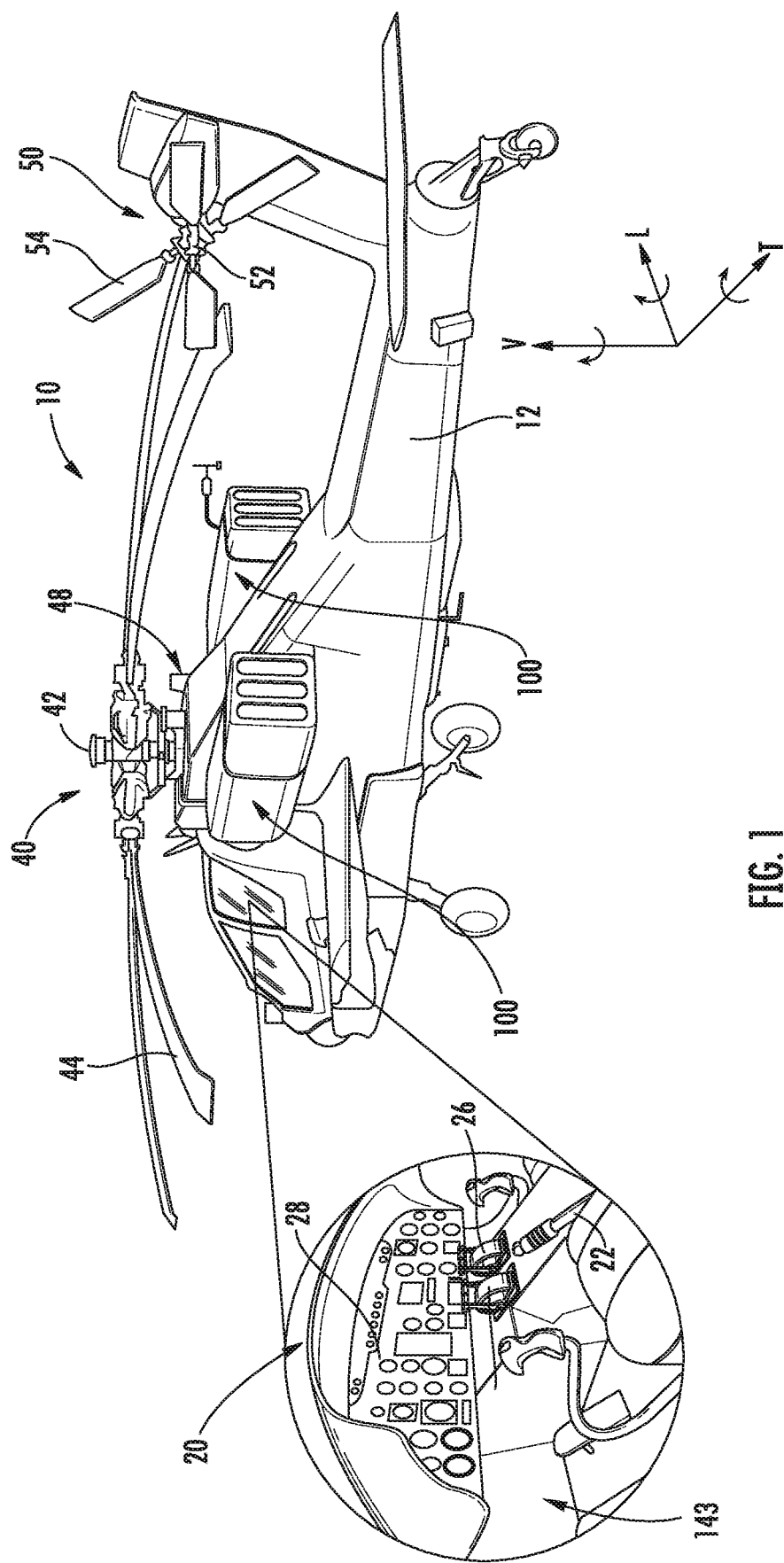
FIGS. 1-2 are perspective views of an exemplary aircraft in accordance with an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Embodiments of systems and methods are disclosed for providing lubricant at a gear assembly during partial or complete loss of lubricant flow from a lubricant pump. The systems include a gear assembly including two or more gears arranged together to define a gear mesh. A lubricant dispenser disposed at an out-of-mesh side, or additionally/alternatively, at an in-mesh side of the gear mesh, is configured to provide a flow of lubricant to the gear mesh. A walled lubricant tank defines a reservoir inlet opening adjacent to the out-of-mesh side of the gear mesh. A walled conduit is coupled in fluid communication from the walled lubricant tank to the in-mesh side of the gear mesh such as to provide a flow of lubricant to one or more of the gears at the in-mesh side of the gear mesh.

The methods include feeding lubricant to a lubricant reservoir via the lubricant reservoir inlet opening via windage or fluid dynamic effects of the lubricant thrust from the gear mesh into the lubricant reservoir during normal gear assembly or aircraft operation (e.g., flow of lubricant from a lubricant pump). Lubricant flows via gravitational force from the lubricant tank through the walled conduit to the in-mesh side of the gear mesh. As such, following partial or complete loss of lubricant flow from the lubricant pump, the systems and methods provided herein provide an emergency flow of lubricant from the lubricant tank to the gear mesh via gravitational forces through the walled conduit.

Systems and methods generally provided herein provide a flexible and modular emergency lubricant reservoir for a gear assembly for an aircraft. Various embodiments of the system may be integrated to a gear assembly housing surrounding the two or more gears, the walled conduit, and one or more lubricant dispensers or lubricant dispenser devices disposed within the gear assembly housing. As such, various embodiments of the system may not require any connections, attachments, or couplings external of the gear assembly housing, thereby mitigating risks associated with lubricant loss, system failure, or general gear assembly and aircraft safety and performance.

Systems and methods generally provided herein further enable adapting (e.g., via additive manufacturing) lubricant tank geometry based on a desired operation, mission, or risk mitigation for the aircraft to which the gear assembly is attached. Embodiments of the system and method enable filling the emergency lubricant reservoir via thrusting or spraying lubricant from the gear mesh to the lubricant reservoir. As such, systems and methods provided herein enable filling the emergency lubricant reservoir during normal operation of the gear assembly and aircraft (e.g., via lubricant provided from a lubricant pump).

Additionally, embodiments shown and described herein may eliminate the need for pre-flight operations such as fill-ups, priming, or other provision of lubricant to the lubricant reservoir. As such, eliminating such pre-flight operations may mitigate or eliminate risks relative to human error in performing such pre-light operations.

Still further, or alternatively, embodiments provided herein may eliminate components dedicated to providing lubricant to the lubricant reservoir during normal operation, thereby reducing system weight, reducing performance and safety risks, and improving system and aircraft performance.

Figure 2:
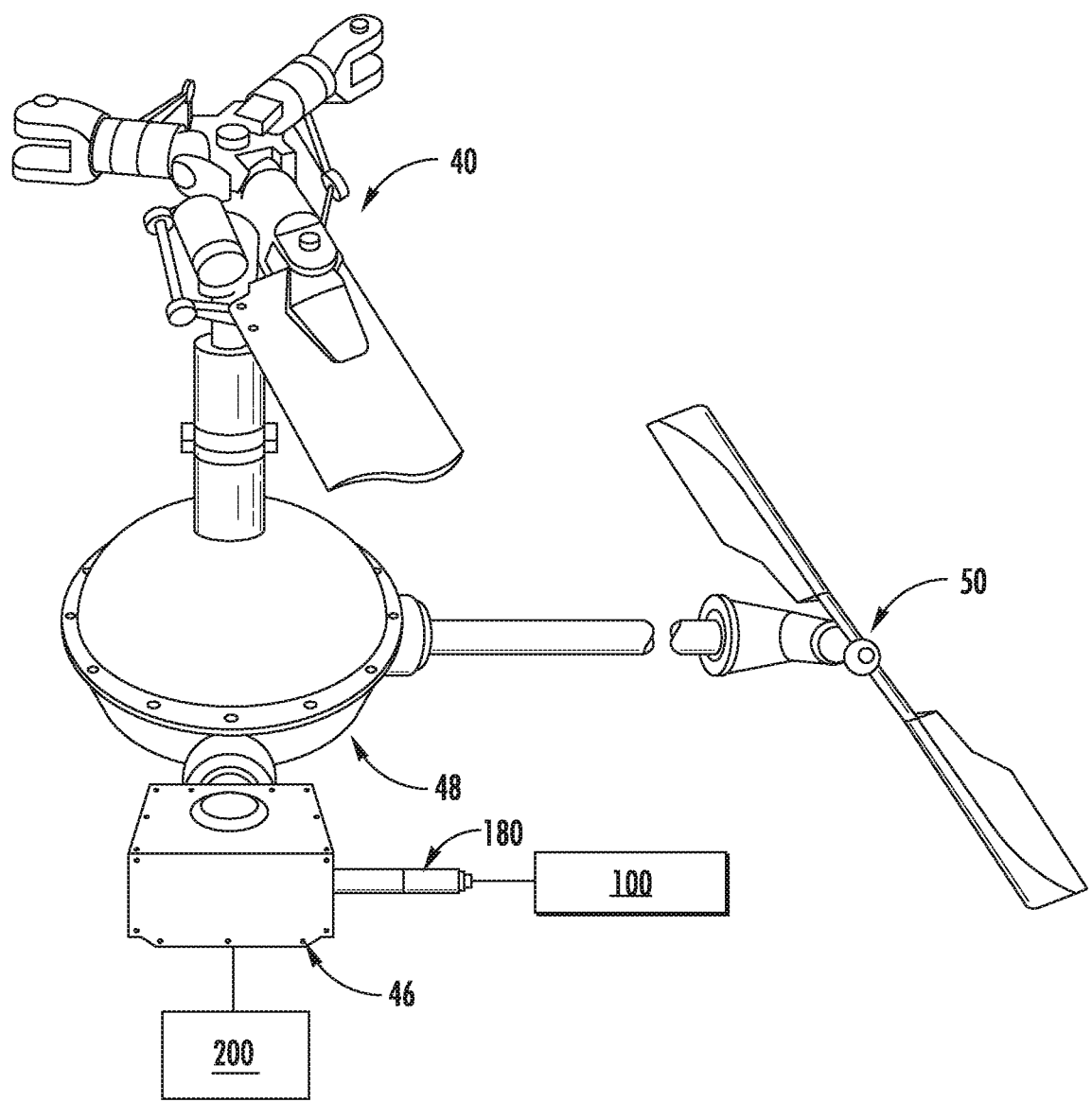

FIGS. 1-2 provide perspective views of an exemplary aircraft 10 in accordance with the present disclosure. The aircraft 10 defines an orthogonal coordinate system, including three orthogonal coordinate axes. More specifically, the three orthogonal coordinate axes include a lateral axis L, a longitudinal axis T, and a vertical axis V. In operation, the aircraft 10 may move along or around at least one of the lateral axis L, the longitudinal axis T, and the vertical axis V.

In the embodiment illustrated in FIG. 1, the aircraft 10 includes an airframe 12 and a cockpit 20. In one embodiment, the cockpit 20 may include a collective pitch input device 22, one or more throttle input devices 26 and an instrument panel 28. The aircraft 10 further includes a main rotor assembly 40 and a tail rotor assembly 50. The main rotor assembly 40 includes a main rotor hub 42 and a plurality of main rotor blades 44. As shown, each main rotor blade 44 extends outwardly from the main rotor hub 42. The tail rotor assembly 50 includes a tail rotor hub 52 and a plurality of tail rotor blades 54. Each tail rotor blade 54 extends outwardly from the tail rotor hub 52.

Additionally, the aircraft 10 may include an engine 100 to generate and transmit power to drive rotation of the main rotor blades 44 and the tail rotor blades 54. In particular, rotation of the main rotor blades 44 generates lift for the aircraft 10, while rotation of the tail rotor blades 54 generates sideward thrust at the tail rotor assembly 50 and counteracts torque exerted on the airframe 12 by the main rotor blades 44.

Referring now to FIGS. 1-2, the aircraft 10 further includes a main transmission 48 disposed mechanically between the engine 100 and the main rotor assembly 40 and the tail rotor assembly 50. The main transmission 48 generally reduces an output speed of the engine 100 to a speed more suitable for operation of the main rotor assembly 40 and/or the tail rotor assembly 50. The main transmission 48 may further direct power from one or more of the engines 100 to one or more accessories of the aircraft 10. Still further, the main transmission 48 may generally change an axis of rotation between the engine 100 and the main rotor assembly 40. Although not shown in further detail, various embodiments of the main transmission 48 may include a clutch assembly to selectively engage or disengage the main rotor assembly 40 and/or tail rotor assembly 50 from the engine 100. Still further, the main transmission 40 includes a lubricant system providing lubricant to gears, bearings, dampers, etc. of the main transmission 48, such as further described below.

It should be appreciated that, although a particular aircraft has been illustrated and described in regard to the aircraft 10, other configurations and/or aircraft, such as high speed compound rotary-wing aircraft with supplemental translational thrust systems, dual contra-rotating, coaxial rotor system aircraft, turboprops, tilt-rotors, tilt-wing aircraft, vertical take-off or short take-off or landing aircraft, conventional take-off and landing aircraft, fixed wing aircraft, and other turbine driven machines will also benefit from the present disclosure.

Figure 3:
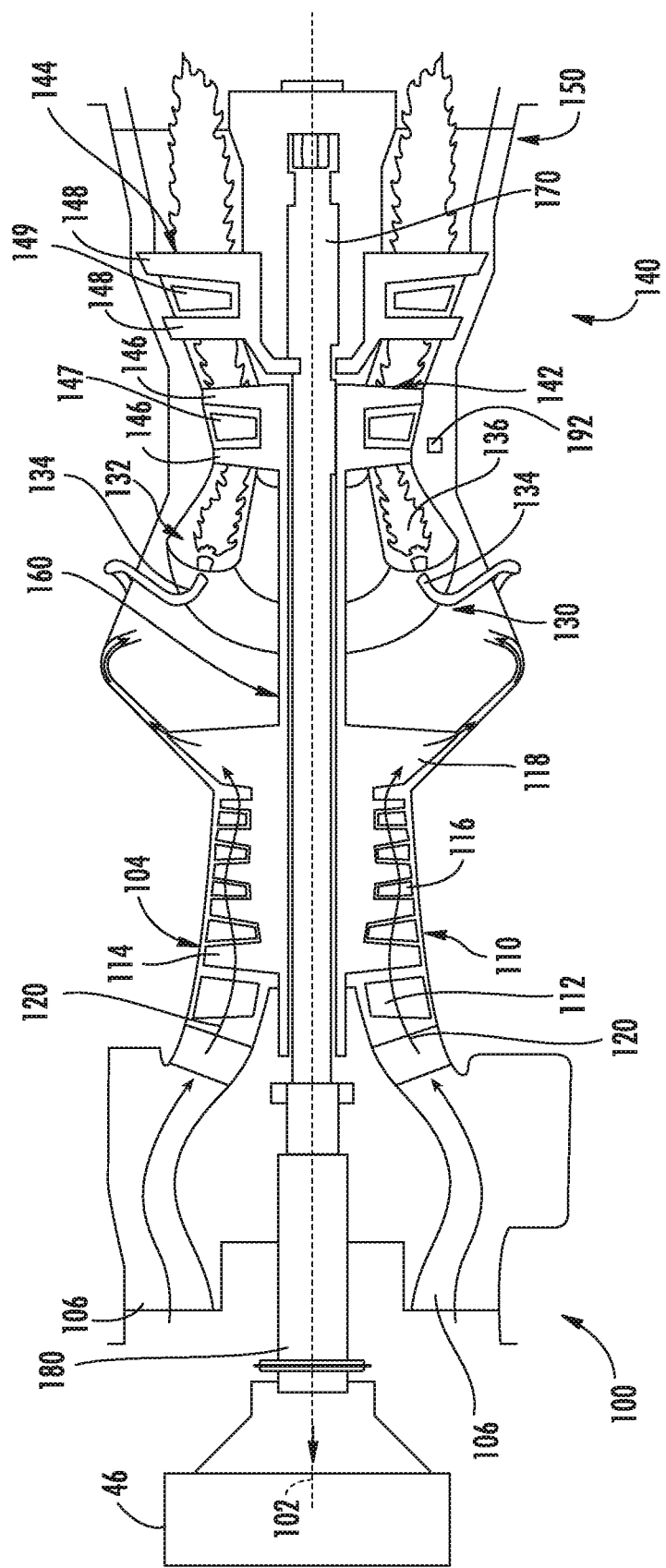
FIG. 3 is an exemplary schematic cross-sectional view of a gas turbine engine in accordance with an aspect of the present disclosure.

FIG. 3 provides a schematic cross-sectional view of an exemplary gas turbine engine 100 in accordance with the present disclosure. As shown in FIG. 3, the gas turbine engine 100 defines a longitudinal or centerline axis 102 extending through for reference. The gas turbine engine 100 may generally include a substantially tubular outer casing 104 that defines an annular inlet 106. The outer casing 104 may be formed from a single casing or multiple casings. The outer casing 104 encloses, in serial flow relationship, a gas generator compressor 110, a combustion section 130, a turbine 140, and an exhaust section 150. The gas generator compressor 110 includes an annular array of inlet guide vanes 112, one or more sequential stages of compressor blades 114, one or more sequential stages of variable vanes 116, one or more sequential stages of one or more stationary compressor vanes, and a centrifugal compressor 118. Collectively, the compressor blades 114, variable vanes 116, stationary compressor vanes, and the centrifugal compressor 118 define a compressed air path 120.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gases 136 drive both the compressor 110 and the turbine 140.

The turbine 140 includes a gas generator turbine 142 and a power turbine 144. The gas generator turbine 142 includes one or more sequential stages of turbine rotor blades 146 and one or more sequential stages of stator vanes 147. Likewise, the power turbine 144 includes one or more sequential stages of turbine rotor blades 148 and one or more sequential stages of stator vanes 149. As will be discussed below in more detail, the gas generator turbine 142 drives the gas generator compressor 110 via a gas generator shaft 160, and the power turbine 144 drives an output shaft 180 via a power turbine shaft 170.

As shown in the embodiment illustrated in FIG. 3, the gas generator compressor 110 and the gas generator turbine 142 are coupled to one another via the gas generator shaft 160. In operation, the combustion gases 136 drive both the gas generator turbine 142 and the power turbine 144. As the gas generator turbine 142 rotates around the centerline axis 102, the gas generator compressor 110 and the gas generator shaft 160 both rotate around the centerline axis 102. Further, as the power turbine 144 rotates, the power turbine shaft 170 rotates and transfers rotational energy to the output shaft 180. As an example, the output shaft 180 of the engine 100 may rotate both the main and tail rotor blades 44, 54 of the aircraft 10 (FIGS. 1-2).

It should be appreciated that, although the aircraft 10 is depicted as including one or more gas turbine engines 100, the aircraft 10 may generally receive power from other engine types, including, but not limited to, piston engines, hybrids, or other engines suitable for transmitting power to one or more of the main rotor assembly 40, the tail rotor assembly 50, a gear assembly 46 (FIGS. 2-3), the main transmission 48, or other systems of the aircraft 10.

Figure 4:
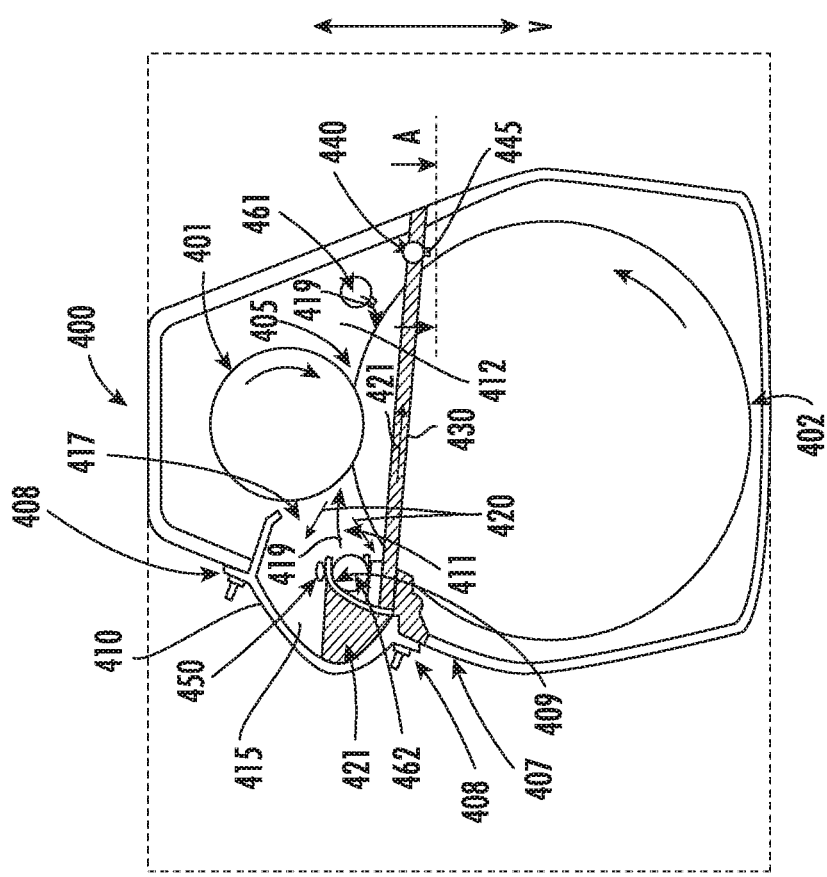
FIG. 4 is a schematic exemplary embodiment of a gear assembly according to an aspect of the present disclosure.

Referring now to FIG. 4, a schematic embodiment of an exemplary gear assembly 400 is generally provided. The exemplary gear assembly 400 depicted in regard to FIG. 4 may at least partially define the gear assembly 46 depicted in regard to FIGS. 1-3. Still further, various embodiments of the gear assembly 400 may be included at one or more of the engine 100, the main rotor assembly 40, the tail rotor assembly 50, the main transmission 48, or generally other gear assemblies at the aircraft 10.

The gear assembly 400 includes a first gear 401 arranged together with a second gear 402 to define a gear mesh 405 at which teeth of each of the first gear 401 and the second gear 402 are meshed. A walled lubricant tank 410 defines a lubricant reservoir 415 and a reservoir inlet opening 417. The reservoir inlet opening 417 is defined adjacent to or alongside an out-of-mesh side 411 (i.e., the side of the gear mesh 405 at which the first gear 401 and the second gear 402 are separating from the gear mesh 405) of the gear mesh 405 to enable feeding, thrusting, propelling, or otherwise providing a portion of lubricant from the gear mesh 405, depicted schematically via arrows 420, to enter the lubricant reservoir 415 through the reservoir inlet opening 417.

Referring still to FIG. 4, a walled conduit 430 is coupled in fluid communication from the walled lubricant tank 410 defining the lubricant reservoir 415 to an in-mesh side 412 (i.e., the side of the gear mesh 405 at which the first gear 401 and the second gear 402 are coming together to form the gear mesh 405) of the gear mesh 405. The walled conduit 430 provides a flow of lubricant from the lubricant reservoir 415 to the in-mesh side 412 of the gear mesh 405. In various embodiments, the walled lubricant tank 410, the walled conduit 430, and a lubricant dispensing device 440 are coupled or attached together to provide a flow of lubricant to the first gear 401, the second gear 402, or both. In one embodiment, the walled conduit 430 is coupled directly to the walled lubricant tank 410 to be in fluid communication with the lubricant reservoir 415. In another embodiment, the walled conduit 430 is coupled directly to the lubricant dispensing device 440 to be in fluid communication with an outlet 445 of the lubricant dispensing device 440 to provide lubricant to the first gear 401, the second gear 402, or both. For example, the walled conduit 430 may define a duct, tube, pipe, manifold, or other walled structure to contain and flow lubricant therethrough.

In still another embodiment, the lubricant reservoir 415 is defined at least partially upward along the vertical axis V of the outlet 445 of the lubricant dispensing device 440. The lubricant dispensing device 440 is disposed at the in-mesh side 412 of the gear mesh 405. The flow of lubricant, shown schematically via arrows 421, from the lubricant reservoir 415 through the walled conduit 430 to the outlet 445 of the lubricant dispensing device 440 is provided via gravitational force. Lubricant is then provided from the lubricant dispensing device 440 to the gear mesh 405 via one or more of the first gear 401 or the second gear 402.

In one example, referring to FIG. 4, lubricant is provided to the in-mesh side 412 of the second gear 402 via the lubricant dispensing device 440. The second gear 402 rotates and provides the lubricant to the first gear 401 at the gear mesh 405, such that both the first gear 401 and the second gear 402 receive lubricant, thermal attenuation, damping, etc. to the gear assembly 400. However, it should be appreciated that in other embodiments, lubricant is provided to the in-mesh side 412 of the first gear 401 via the lubricant dispensing device 440. In still various embodiments, lubricant is provided to the in-mesh side 412 of both the first gear 401 and the second gear 402 via the lubricant dispensing device 440.

Referring still to FIG. 4, the reservoir inlet opening 417 is at least partially disposed upward along the vertical axis V of the lubricant reservoir 415 at which lubricant is contained and flowed through the walled conduit 430. The walled conduit 430 is disposed at a downward angle along the vertical axis V from the lubricant reservoir 415 to the lubricant dispensing device 440, such as to enable the flow of lubricant 421 to egress through the outlet 445 of the lubricant dispensing device 440 via gravitational force.

Figure 5:
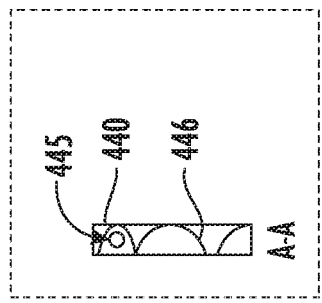
FIG. 5 is a cross-sectional view of an embodiment of a portion of the gear assembly of FIG. 4.

Referring briefly to FIG. 5, a cross-sectional view at the lubricant dispensing device 440 location is generally provided. The lubricant dispensing device 440 includes the outlet 445 disposed proximate to the gear (e.g., second gear 402), such as above a central axis of the gear along the vertical axis V to enable lubricant to drip or flow from the lubricant dispensing device 440 via gravitational force alone. In various embodiments, the lubricant dispensing device 440 may further define teeth 446 corresponding to one or more teeth (not shown) of the proximate gear to which lubricant is provided from the outlet 445. For example, the teeth 446 of the lubricant dispensing device 440 may mesh with the proximate gear, such as the second gear 402 in FIG. 4). Various embodiments of the teeth 446 at the lubricant dispensing device 440 may define helical, double-helical, straight, bevel, spiral, hypoid, crown, worm, non-circular, or rack and pinion type tooth arrangements, or another appropriate gear tooth arrangement, corresponding to the first gear 401 or the second gear 402 (e.g., such as depicted in regard to FIG. 4).

Referring back to FIG. 4, in one embodiment, an overfill device 450 is disposed at the lubricant inlet opening 417 of the lubricant reservoir 415. The overfill device 450 is configured to prevent filling the lubricant reservoir 415 beyond the overfill device 450. For example, the overfill device 450 may define a valve configured to prevent lubricant in the lubricant reservoir 415 from flowing out through the lubricant reservoir inlet opening 417 when the lubricant reservoir 415 is full or when the aircraft is in flight (e.g., at attitude angles, or due to changes in attitude angle or maneuvering).

Various embodiments of the gear assembly 400 further include a gear assembly housing 407 surrounding the first gear 401, the second gear 402, the walled conduit 430, and the lubricant dispensing device 440. In one embodiment, the walled lubricant tank 410 is at least partially defined by the gear assembly housing 407. For example, the walled lubricant tank 410 may define an integral structure with the gear assembly housing 407, such as produced via 3D printing or additive manufacturing, or other processes such as casting, forging, machining, or combinations thereof.

As another example, the walled lubricant tank 410 may be modular and detachable from the gear assembly housing 407 via a flange 408 between the walled lubricant tank 410 and the gear assembly housing 407. The walled lubricant tank 410 may be detached, replaced, or re-sized based on a desired operation, mission, or failure mode mitigation of the gear assembly 400 and aircraft 10. For example, the walled lubricant tank 410 may be exchanged based on a desired geometry, volume, or emergency lubricant supply capacity.

Referring back to FIG. 4, in various embodiments, the axial distance (e.g., perpendicular to the vertical axis V) between the reservoir inlet opening 417 and the gear mesh 405 may generally provide for the lubricant to thrust, propel, or otherwise feed from the gear mesh 405 into the lubricant reservoir 415 during normal operation of the gear assembly 400 and aircraft 10.

In still various embodiments, the gear assembly 400 may further include one or more lubricant dispensers providing a flow of lubricant from a lubricant pump 200 (FIG. 2). The lubricant dispensers may generally define nozzles, spray-bars, or other devices for flowing lubricant to at least the gears of the gear assembly. For example, referring to FIG. 4, the gear assembly 400 may include a first lubricant dispenser 461 disposed at the in-mesh side 412 of the gear mesh 405. The gear assembly 400 includes a second lubricant dispenser 462 disposed at the out-of-mesh side 411 of the gear mesh 405. The lubricant dispenser provides a flow of lubricant, depicted via arrows 419, to the first gear 401 and the second gear 402, such as at the gear mesh 405.

In one embodiment, the walled lubricant tank 410 includes a walled portion 409 contoured to at least partially surround the second lubricant dispenser 462. The contoured portion 409 surrounding the second lubricant dispenser 462 may enable a more compact geometry of the gear assembly 400, such as to enable disposing the lubricant reservoir inlet opening 417 sufficiently proximate to the gear mesh 405 to enable normal operation of the gear assembly 400 and aircraft 10 to propel, spray, or otherwise feed lubricant from the gear mesh 405 into the lubricant reservoir 415. The contoured portion 409 may further enable the second lubricant dispenser 462 to be disposed within one or more ranges of diameter distance (i.e., multiples or fractions of the diameter of one or more gears 401, 402) such as described herein, such as to enable sufficiently proximate positioning of the lubricant reservoir inlet opening 417 relative to the gear mesh 405.

Figure 6:
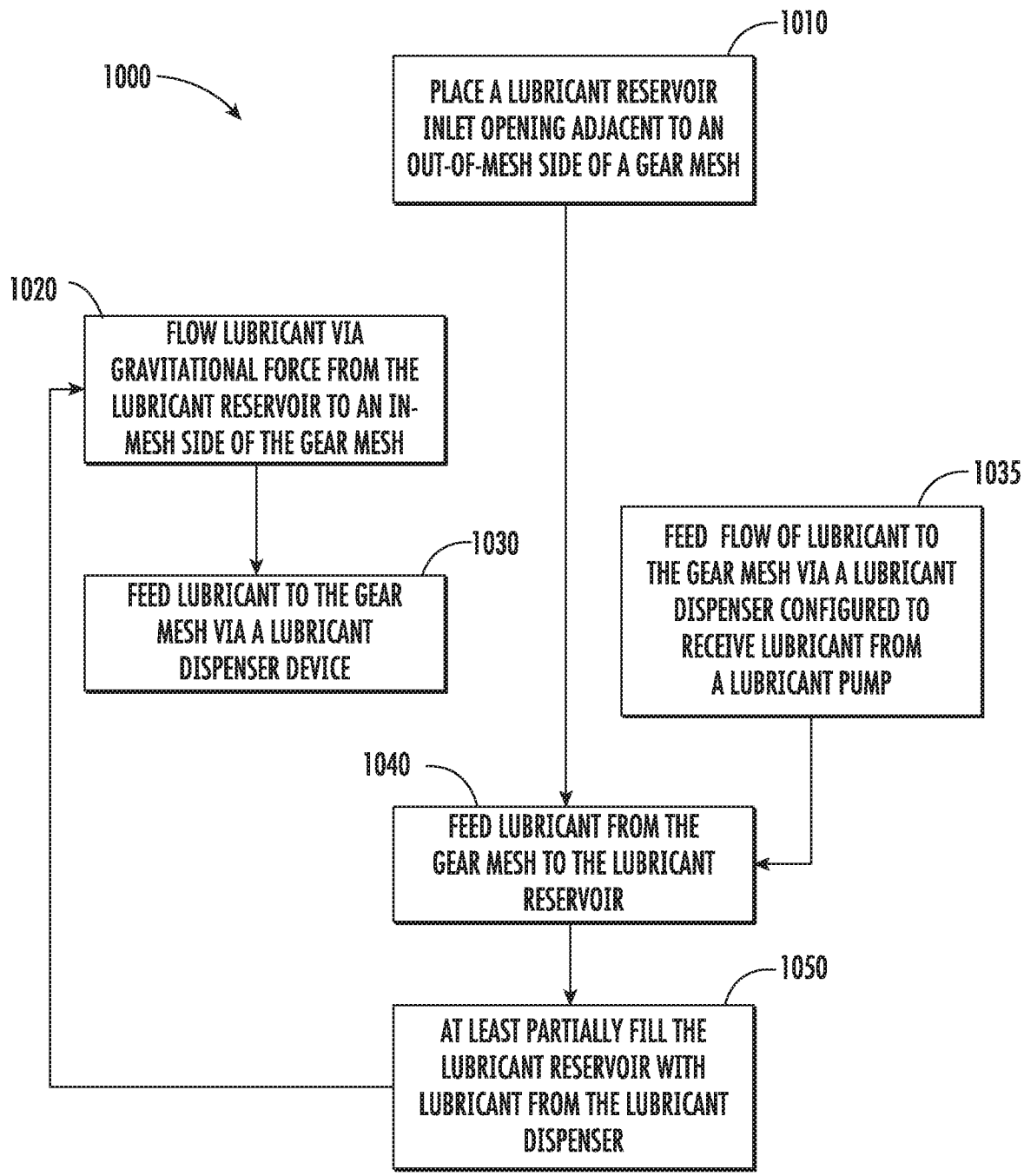
FIG. 6 is a flowchart outlining steps of an exemplary method for mitigating lubricant flow loss at a gear assembly.

Referring now to FIG. 6, a flowchart outlining exemplary steps of a method for mitigating lubricant flow loss at a gear assembly is generally provided (herein after, "method 1000"). Embodiments of the method 1000 generally provided herein may enable gear assemblies (e.g., gear assembly 400) defining power gearboxes, transmissions, or other gear assemblies for aircraft (e.g., aircraft 10) to receive a flow of lubricant following a loss of lubricant provided by a lubricant pump or other pressurizing lubricant flow device. The method 1000 may generally be utilized with gear assemblies such as the embodiments shown and described in regard to FIGS. 1-5. Steps of the method 1000 may be described further below in regard to the systems depicted in regard to FIGS. 1-5. However, the method 1000 may generally be applied or utilized for gear assemblies and aircraft defining lubricant dispensing devices providing lubricant to an out-of-mesh side of a gear mesh, or to both an out-of-mesh side and an in-mesh side of a gear mesh including high pitch line velocities.

The method 1000 includes at 1010 placing a lubricant reservoir inlet opening of a lubricant reservoir adjacent to an out-of-mesh side of a gear mesh; at 1020 flowing lubricant via gravitational force from the lubricant reservoir to an in-mesh side of the gear mesh; and at 1030 feeding lubricant to the gear mesh, such as via a lubricant dispenser device 440 shown and described in regard to embodiments of the gear assembly 400 depicted in FIGS. 4-5.

The method 1000 may further include at 1035 feeding, via a lubricant dispenser configured to receive lubricant from a lubricant pump, a flow of lubricant to the gear mesh. For example, the step at 1035 may generally provide lubricant to the gear mesh via normal operation of the gear assembly in which the lubricant pump is properly functioning or otherwise operable to flow lubricant to the gear assembly under non-emergency conditions. As another example, the lubricant dispenser, such as an out-of-mesh lubricant dispenser (e.g., second lubricant dispenser 462) may define the primary contributor of lubricant to gears (e.g., first gear 401, second gear 402, etc.) in contrast to an emergency lubricant dispenser device (e.g., lubricant dispenser device 440) configured to provide an emergency flow of lubricant via gravitational forces when the gear assembly or aircraft fails to provide the flow of lubricant via the lubricant dispenser (e.g., lubricant dispenser 461, 462), such as depicted via arrows 419 (FIG. 4). As yet another example, an out-of-mesh dispenser (e.g., second lubricant dispenser 462) and an in-mesh dispenser (e.g., first lubricant dispenser 461) may together primarily contribute lubricant to the gears.

The method 1000 may further include at 1040 feeding lubricant from the gear mesh to the lubricant reservoir via the lubricant reservoir inlet. For example, such as described herein, the lubricant reservoir inlet may be disposed proximate to the gear mesh such as to enable normal operation of the gear assembly (e.g., rotation of the gears, providing pressurized flow of lubricant to the gear mesh via one or more lubricant dispensers, etc.) to feed lubricant to the lubricant reservoir.

It should be appreciated that in various embodiments, the emergency flow of lubricant is generally constant or active during normal operation of the gear assembly and aircraft. In various embodiments, the flow of lubricant via gravitational force may be altered based on the mission, operation, or expected failure mode of the gear assembly and aircraft, such as to provide a sufficient amount or flow rate of lubricant relative to the size of the lubricant reservoir, cooling requirements, durability, performance, etc., relative to the duration of continued operation during emergency lubricant conditions, or other mission or operational factors.

The method 1000 may further include at 1050 at least partially filling the lubricant reservoir with lubricant from the lubricant dispenser after the flow of lubricant from the lubricant dispenser has been received by the gear mesh. For example, during normal operation of the gear assembly and aircraft, the lubricant dispenser (e.g., lubricant dispenser 461, 462) sprays lubricant 419 to the gears and operation of the gear assembly propels at least a portion of the lubricant from the gear mesh into the lubricant reservoir via the lubricant reservoir inlet opening.

Embodiments of gear assemblies 400, aircraft 10, and methods 1000 for providing a flow of lubricant following partial or complete loss of lubricant flow from the lubricant pump 200 are generally provided. Embodiments generally provided herein provide a flexible and modular emergency lubricant reservoir and lubricant flow system and method for the gear assembly 400 defining main transmission, main rotor, tail rotor, power gearbox, or other gear assembly for the aircraft 10. Various embodiments of the gear assembly 400 may be integrated to the gear assembly housing 407 surrounding the two or more gears 401, 402, the walled conduit 430, and one or more lubricant dispensers 461, 462 or lubricant dispenser devices 440 disposed within the gear assembly housing 407. As such, various embodiments of the gear assembly 400 may not require any connections, attachments, or couplings external of the gear assembly housing 407, thereby mitigating risks associated with lubricant loss, system failure, or general gear assembly and aircraft safety and performance.

Embodiments of the gear assembly 400 and method 1000 generally provided herein further enable adapting (e.g., via additive manufacturing) the geometry of the walled lubricant tank 410 based on a desired operation, mission, or risk mitigation for the aircraft 10 to which the gear assembly 400 is attached. Embodiments of the gear assembly 400 and method 1000 enable filling the emergency lubricant reservoir 415 via thrusting, spraying, propelling, or otherwise feeding lubricant from the gear mesh 405 to the lubricant reservoir 415. As such, the gear assembly 400 and method 1000 provided herein enables filling the emergency lubricant reservoir 415 during normal operation of the gear assembly 400 and aircraft 10 (e.g., via lubricant provided from the lubricant pump 200).

Additionally, embodiments shown and described herein may eliminate the need for pre-flight operations such as fill-ups, priming, or other provision of lubricant to the lubricant reservoir. As such, eliminating such pre-flight operations may mitigate or eliminate risks relative to human error in performing such pre-light operations. Still further, or alternatively, embodiments provided herein may eliminate components dedicated to providing lubricant to the lubricant reservoir during normal operation, thereby reducing system weight, reducing performance and safety risks, and improving system and aircraft performance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gear assembly of an aircraft including an engine, the gear assembly comprising:
   a first gear meshed with a second gear to define a gear mesh;
   a walled lubricant tank defining a lubricant reservoir and a reservoir inlet opening, wherein the reservoir inlet opening is defined adjacent to an out-of-mesh side of the gear mesh, wherein at least a portion of lubricant from the gear mesh enters the lubricant reservoir through the reservoir inlet opening;
   a walled conduit coupled in fluid communication from the walled lubricant tank to an in-mesh side of the gear mesh; and
   a lubricant dispensing device coupled to the walled conduit and disposed at the in-mesh side of the gear mesh, the lubricant dispensing device configured to provide lubricant from the lubricant reservoir to the gear mesh via one or more of the first gear or the second gear,
   wherein the lubricant reservoir is configured to provide an emergency flow of lubricant to the gear mesh during partial or complete loss of lubricant flow from a lubricant pump, and
   wherein the emergency flow is a drip from the lubricant dispensing device via gravitational force.

2. The gear assembly of claim 1,
   wherein the lubricant dispensing device is coupled in fluid communication with the walled conduit.

3. The gear assembly of claim 1, wherein the lubricant dispensing device defines an outlet in fluid communication with the walled conduit and the lubricant reservoir, wherein a flow of lubricant from the lubricant reservoir and the walled conduit is provided to one or more of the first gear or the second gear from the lubricant dispensing device.

4. The gear assembly of claim 1, wherein the walled lubricant tank, the walled conduit, and the lubricant dispensing device are coupled together to provide a flow of lubricant to the first gear or the second gear, or both, via gravitational force.

5. The gear assembly of claim 1, wherein the reservoir inlet opening is at least partially disposed upward of the lubricant reservoir.

6. The gear assembly of claim 1, wherein the walled conduit is disposed at a downward angle from the lubricant reservoir to the lubricant dispensing device.

7. The gear assembly of claim 1, further comprising:
   a gear assembly housing surrounding the first gear and the second gear, wherein the walled lubricant tank is at least partially defined by the gear assembly housing.

8. The gear assembly of claim 1, further comprising:
   a first lubricant dispenser disposed at the in-mesh side of the gear mesh; and
   a second lubricant dispenser disposed at the out-of-mesh side of the gear mesh,
   wherein the first lubricant dispenser and the second lubricant dispenser are configured to provide a flow lubricant from the lubricant pump to the gear assembly.

9. The gear assembly of claim 1, further comprising:
   an overfill device disposed at the lubricant reservoir, wherein the overfill device is configured to prevent filing the lubricant reservoir beyond the overfill device.

* * * * *